UNITED STATES PATENT OFFICE.

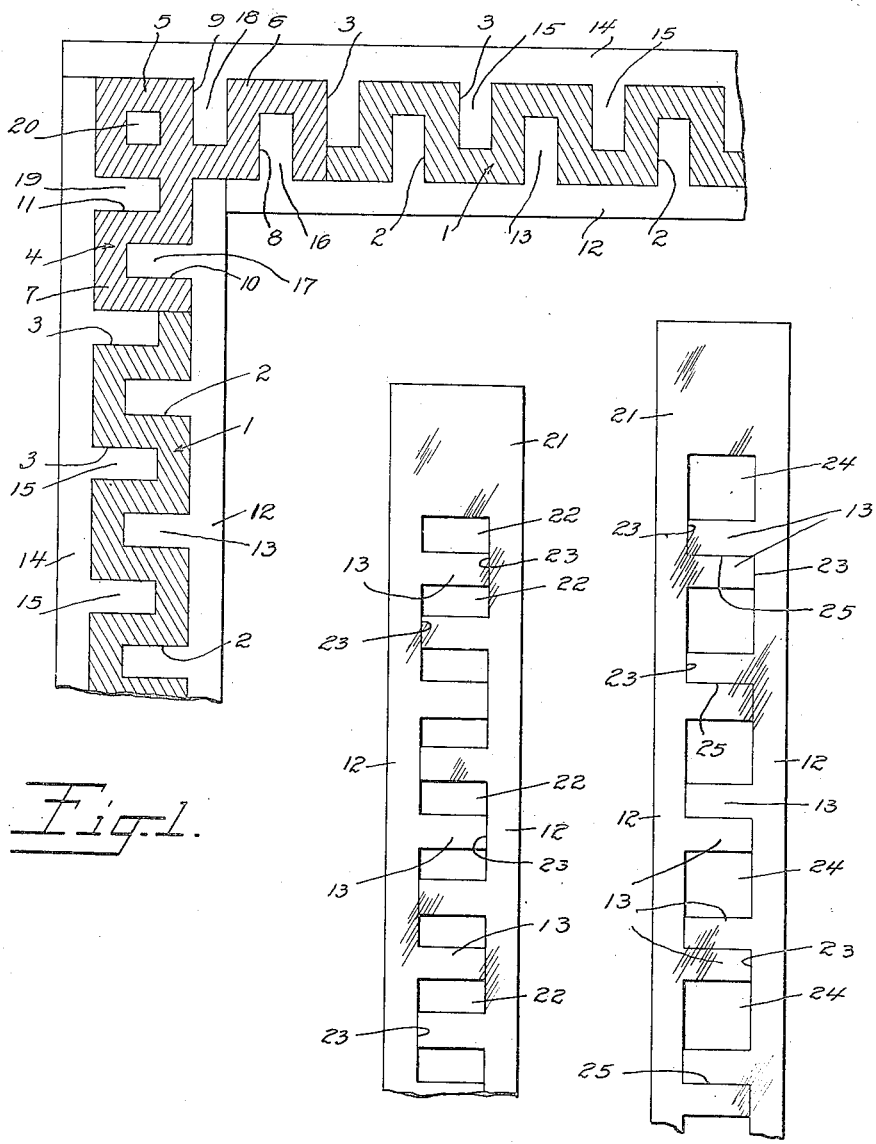

WILLIAM J. KENT, OF BROOKLYN, NEW YORK, ASSIGNOR TO PEERLESS RUBBER MANUFACTURING COMPANY, A CORPORATION OF NEW YORK.

METHOD OF MAKING RUBBER TILING.

1,422,579.            Specification of Letters Patent.       Patented July 11, 1922.

Application filed April 9, 1921. Serial No. 460,105.

*To all whom it may concern:*

Be it known that I, WILLIAM J. KENT, a citizen of the United States, residing at Brooklyn, in the county of Kings and State of New York, have invented a certain new and useful Method of Making Rubber Tiling, of which the following is a full, clear, and exact description.

This invention relates to a new and useful method of making rubber tiling and more particularly to tiling that is made in long and comparatively narrow strips such as borders for rubber-tiled floors and the like.

Referring to the drawings showing one embodiment of the invention,

Fig. 1 is a fragment of a border embodying the invention;

Fig. 2 is a part of the border illustrating the manner of forming same; and

Fig. 3 is a part of the border similar to Fig. 2 but illustrating a different manner of forming it.

The particular type of border shown in the drawings is that commonly known as a Grecian border and is shown for the purpose of illustrating my invention, and while my invention is especially adapted for this particular type of border it will presently be readily seen that the invention is not restricted to this specific type and that many changes may be made providing the features set forth in the appended claims be maintained.

The present border comprises the central portion 1 which may be made in any desired color or colors and cut or died out from sheet rubber by any of the usual methods. It resembles a narrow strip of rubber running lengthwise of the border in zigzag fashion, the essential being, for the adoption of my invention, that it should present a series of recesses along an edge thereof as for instance the recesses 2. As a matter of fact the type of border illustrated in the present instance provides a second series of recesses 3 on the opposite side from the recesses 2 but it is obvious that the border may be easily modified so that only one of the series of the recesses 2 and 3 will be present.

A cornerpiece 4 is cut or died out from a sheet of rubber and may be of any desired color but is usually the same color as the strip 1. It may vary as to design, the extreme corner in the present instance being shown in the form of a perforated square 5. If certain features of my invention are to be utilized as will later appear, the cornerpieces should be provided with a part having a recess in line (when assembled) with the recesses formed along the edge of the strip 1. In the present instance the cornerpiece is provided with the parts 6 and 7 which are in fact continuations of the zigzag strips 1—1 and are of sufficient length so that each includes two recesses 8—9 and 10—11 respectively, the recesses 8 and 10 being in line with the recesses 2 on the horizontal and vertical borders respectively (Fig. 1) and the recesses 9 and 11 being in line with the recesses 3 on these borders respectively.

The border is further provided with a marginal strip adjacent the recessed edge of a contrasting color and the recesses are filled with rubber pieces the color of the marginal strip. In the present instance on account of there being a line of recesses on either side there would usually be, as shown, two marginal strips, one on each side and rubber pieces completely filling all the recesses on both sides.

In the usual method of making rubber borders for tiling, the plain strips of rubber are cut and assembled alongside the zigzag strip. The pieces for filling the recesses are cut or died from sheet rubber stock and are counterparts of the recesses that they are intended to fill. These are then placed one by one in the recesses. In the usual method after the pieces for filling the recesses are cut they are thrown into a box or other receptacle and the workman picks each one out by sticking an awl into it, and as thus supported on the point of the awl places it in the recess. This presents a very slow and tedious operation and adds very materially to the expense of the finished border.

My invention is directed to simplifying the method of making these borders and thereby materially increasing the output and decreasing the cost and also providing a better border than one made in the usual manner. In my invention, instead of making the filling pieces and marginal strip separate thereby necessitating the slow and tedious method of assembling as above described, I form the strip, as for instance the strip 12, with a series of integral projections 13 extending from one side thereof which are exact counterparts of the recesses they are intended to fill and which are accurately spaced to bring them into exact register with the respective recesses. All that is then necessary in assembling the parts is to place the strips 1 and 12 side by side at the same time successively slipping the projections 13 into their respective recesses, this being a very simple matter, as each successive projection is automatically brought to register with its respective recess simultaneously with the placing of the previous one in its recess, so that all the operator need do is to place the two strips side by side and then run his finger down the border pressing each projection into its registering recess.

It will thus be seen that this provides a very simple, quick, and economical method of making rubber borders for rubber tiling. Besides providing great speed in assembling, it has the further advantage that the projections will not be easily dislodged during subsequent handling before vulcanization, as they are all integral with the marginal strip, which materially aids in holding them in place, also the marginal strip is held securely in place by the projections and is held much more firmly against the strip 1 than would otherwise be the case. Moreover the integral character of the projections 13 provides an interlocking of the strips 1 and 12 and thereby stiffens or strengthens the border during its subsequent handling prior to vulcanization. Moreover the projections 13 being integral with the strip 12 they make a flush smooth joint therewith which adds to the appearance and strength of the finished product. Where the projections 13 are made separate it will be observed that there is a line of jointure throughout the entire edge of the strip 12 with the strip 1 and projections 13, and where there would be a tendency for the strip 12 to break away or crack along this line as from flexure or other rough treatment in handling there would be no such danger when the projections are made integral and thereby breaking up the continuity of the line of jointure.

While my invention does not require that two oppositely disposed strips be used the type of border here shown having a second line of recesses another strip 14 having the projections 15 is employed opposite the strip 12 which in the present instance are similar to the strip 12 and projections 13 although it is obvious that the oppositely disposed strips and projections may vary in design as desired.

The borders are generally made at the factory in long strips and sold as a finished product for use in rubber tiling of floors in which instance the cornerpieces are usually separate from the border and assembled as the borders are assembled on the floor with the other rubber tiling. The corners may, however, be assembled at the factory in the manufacture of mats and the like which are sold as completed articles. In either instance my invention as already described makes it possible to lock the cornerpiece with the borders in which event the strip 12 is continued beyond the strip 1 so that a projection, as for instance the projection 16, will fit in the recess 8 of the cornerpiece and lock it together with the strips 1 and 12 firmly in place. It is obvious that the cornerpiece may be made with a plurality of the recesses 8 if so desired. In the present instance as already remarked it is formed with a recess 10 which engages a projection 17 on the vertical strip 12 as shown, and other recesses 9 and 11 are provided which engage respectively the projections 18 and 19 formed respectively on the horizontal and vertical strips 14. The perforation in the cornerpiece 5 is filled with a piece of rubber 20 usually similar to the rubber forming the strips 12 and 14, which completes the border.

While the strip 12 with its integral projections 13 may be formed in any desired manner I have shown in Figs. 2 and 3 a preferred way of forming the strips which is not only economical as to saving in material but is also economical as it enables two strips to be simultaneously cut. The two strips are cut or died out simultaneously from a strip of rubber 21 by cutting the projections of one strip from the stock between the projections of the other strip. In the present instance all that is necessary is to cut or die out the strip 21 to provide the perforations 22 (see Fig. 2) and to cut the projections 13 along the lines 23 where they unite with the opposite strip. This will result in forming two strips with integral lugs simultaneously with a minimum amount of waste. Fig. 3 shows the strips 12 identical to the strip 12 of Fig. 2 in every respect, the portions 24 cut away being twice the size of the portions 22 the respective projections being disposed side by side necessitating cutting along the lines 23 and also along the line 25, all as clearly shown in the drawings.

Following the usual practice the contacting edges of the various parts are coated with rubber cement and when all the parts have been assembled the border is vulcanized in the usual manner, the sheet rubber from which the parts are cut being semi-vulcanized in the usual manner if desired. Moreover while I have generally referred in the specification and claims to the product as a border it will be understood that this term is intended to include rubber tiling made in strip form whether it be strictly a border or strip tiling that may be used to cover the entire floor, as will be readily perceived might be desirable in some instances. Also where the term rubber is used it will be understood to include any suitable rubber compound or rubber substitute or other material adapted for such use. As is obvious the embodiment shown in the drawings may be modified in various ways without departing from the spirit of the invention and I do not intend to limit myself except as indicated in the appended claims.

Having thus described my invention, what I claim and desire to protect by Letters Patent is:—

1. A method of making tiling which comprises forming similar strips with integral projections in pairs simultaneously from a single sheet of rubber, the projections of one strip being formed from the stock between the projections of the other strip, assembling the strips thus formed with other portions of the tiling having recesses by fitting the projections in said recesses and finally vulcanizing the tiling.

2. A method of making tiling which comprises forming strips with integral projections in pairs simultaneously from a single sheet of rubber, the projections of one strip being formed from the stock between the projections of the other strip by cutting out the surplus stock from between the projections and severing the strips from each other at their lines of contact, assembling the strips thus formed with other portions of the tiling having recesses by fitting the projections in said recesses and finally vulcanizing.

Signed at New York, county of New York, and State of New York, this 7th day of April, 1921.

WILLIAM J. KENT.